United States Patent
Lindsay

[15] 3,670,638
[45] June 20, 1972

[54] MEANS FOR INDICATING THE LENGTH OF ROLL FILM IN A FILM CARTRIDE FOR PROCESSING PURPOSES

[72] Inventor: Douglas J. Lindsay, Rochester, N.Y.
[73] Assignee: Eastman Kodak Company, Rochester, N.Y.
[22] Filed: June 15, 1970
[21] Appl. No.: 46,359

[52] U.S. Cl. ............................................95/31 CA, 95/87 R
[51] Int. Cl. .................G03b 1/60, G03b 17/26, G03d 13/00
[58] Field of Search ...................95/31 R, 31 FS, 31 CA, 89 R

[56] References Cited

UNITED STATES PATENTS

| | | |
|---|---|---|
| 3,444,795 | 5/1969 | Nerwin................................95/31 CA |
| 3,485,157 | 12/1969 | Nerwin................................95/31 CA |
| 3,334,566 | 8/1967 | Friedel..................................95/89 R |

*Primary Examiner*—Joseph F. Peters, Jr.
*Attorney*—Robert W. Hampton and D. Peter Hochberg

[57] ABSTRACT

A film cartridge defines a discontinuity indicative of the length of the film in the cartridge for determining the mode of operation of a film processor used to process the film.

2 Claims, 2 Drawing Figures

PATENTED JUN 20 1972 3,670,638

DOUGLAS J. LINDSAY
INVENTOR.

BY D. Peter Hochberg
Robert W. Hampton
ATTORNEYS

MEANS FOR INDICATING THE LENGTH OF ROLL FILM IN A FILM CARTRIDE FOR PROCESSING PURPOSES

BACKGROUND OF THE INVENTION

1. Field of the Invention

The present invention relates to film cartridges, and in particular to film cartridges having means indicative of the length of the film therein for determining the mode of operation of the processor used to process the film.

2. Description of the Prior Art

The popularity with which film cartridges have been received in recent years has substantially increased the volume of film processing performed, and has created a need for means to expedite the film processing function. An impediment to the efficiency of large volume processing operations associated with roll film in film cartridges and magazines exists by virtue of the similarity of these film containers regardless of the characteristics of the film held therein. Since the nature of the processing solution to be employed with a particular photographic film depends on the type of the film, as indicated by its speed or sensitivity, means have been devised to facilitate the sorting of the film containers according to the film type. Thus, U.S. Pat. Nos. 3,276,340, 3,276,714, 3,286,945 and 3,444,795 teach the provision of tactile code means adapted to be sensed by sorting apparatus to direct the film to the proper film processing solutions, and additionally to set a camera according to the film speed.

Although film cartridges and magazines have labels affixed thereto indicating the length of the filmstrip therein, they have not been provided with indicia indicative of the length of the film for determining the mode of operation of the processing apparatus. For example, commonly assigned U.S. Pat. application Ser. No. 854,886, entitled "Web Splicing and Identifying Apparatus," filed Sept. 3, 1969 in the name of Rosborough et al, disclose film processing apparatus including means for splicing successive lengths of filmstrip, wherein the required determination of the length of each such length is accomplished after the film has been removed from the cartridge by sensing the presence or absence of a paster tab at the shorter of two possible film lengths. Thus, film length determination must be made for processing purposes after the film removal operation has commenced, and tactile means must be provided on the film for indicating the length of the film. Such apparatus could not readily be used with film cartridges not having a paster tab which could be sensed by the machine operator or by automatic paster tab sensing device. U.S. Pat. No. 3,485,157 teaches the provision of a projection on a film magazine indicative of a predetermined length of film in the magazine, but this provision is employed for setting a camera film counter.

SUMMARY OF THE INVENTION

An object of the present invention is to effect the proper mode of operation of a film processor for processing film from a film cartridge, the processor having different modes of operation for different lengths of film in the cartridge.

Another object is to provide means on a film cartridge indicative of the length of filmstrip in the cartridge for effecting the proper mode of operation of a film processor.

A more specific object of the invention is to provide a film cartridge adapted to hold either of two specific lengths of roll film, and to provide a discontinuity on the cartridge only when a predetermined one of the lengths is in the cartridge, to thereby adjust the film processor used to process the film to its proper mode of operation.

A further object of the present invention is to provide the combination of a film cartridge having means for indicating which of a plurality of lengths of roll film is in the cartridge, and a film processor having means responsive to the film length indicating means for effecting a predetermined mode of operation of the processor.

Other objects will become apparent from the description to follow and from the dependent claims.

The foregoing objects are achieved according to a preferred embodiment of the invention by the provision of a film cartridge having opposed, parallel film supply and take-up compartments connected by a first wall defining a film support surface parallel to the compartments, and a second wall normal to the compartments and the support surface, the second wall defining a notch or other discontinuity only if one of two predetermined lengths of film are in the cartridge. The cartridge is adapted for use with a film processor having modes of operation corresponding to each of the film lengths, and the processor has means responsive to the presence or absence of the notch for effecting the proper mode of operation of the processor.

BRIEF DESCRIPTION OF THE DRAWINGS

In the detailed description of the preferred embodiment of the invention presented below, reference is made to the accompanying drawings wherein.

DETAILED DESCRIPTION OF THE INVENTION

Figure 1:
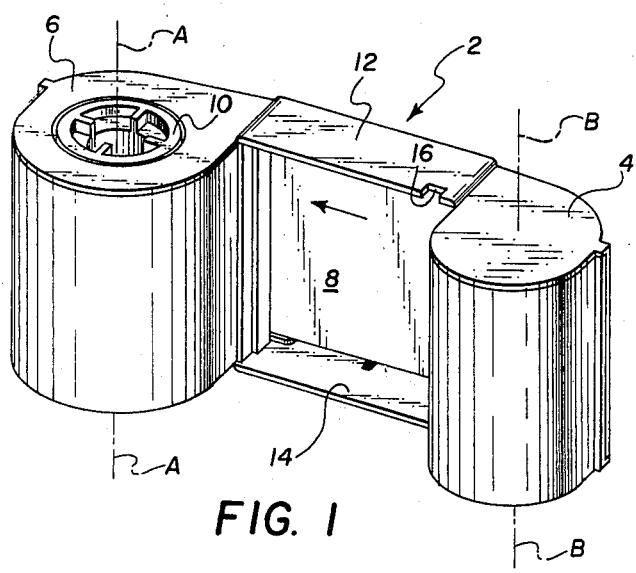
FIG. 1 is a perspective view of a film cartridge according to the invention.

Referring to FIG. 1, a film cartridge 2 includes a supply compartment 4 defining a generally cylindrical chamber for initially containing unexposed roll film in convolute form, a take-up compartment 6 for receiving exposed roll film in convolute form, and a back wall member defining a forwardly facing film support surface 8 for supporting film for exposure in a camera. Film is transported from supply compartment 4 and across support surface 8 in the direction indicated by the arrow by rotating a hub 10 of a core extending generally along the longitudinal axis A—A of the take-up compartment, the leading end of the roll film being initially attached to the core. Supply compartment 4 has a longitudinal axis B—B parallel to axis A—A, each of these axes being parallel to surface 8. A pair of opposed, forwardly extending walls 12 and 14 are located on the lateral sides of the back wall member and interconnect the two film compartments. Walls 12 and 14 are each perpendicular to film support surface 8 and to the longitudinal axes of the two compartments, and can be used to locate the cartridge in a camera.

Cartridge 2 is adapted to hold film of either of two lengths, namely a 12 exposure frame-length or a 20 exposure frame-length. A notch 16 is provided in a prescribed position in upper wall 12 only if the film in the cartridge has a 20 exposure frame-length, for reasons set forth below. Thus, the absence of notch 16 in wall 14 would indicate that 12 exposure frame-length film was contained in the cartridge.

Cartridge 2 is loaded in a camera in the conventional manner with support surface 8 facing forwardly towards the camera objective and the two film compartments being received in appropriately structured compartments in the camera. The film is intermittently transported from the supply compartment to the take-up compartment, with successive exposure frames being exposed while positioned on support surface 8. After the last frame of film has been exposed and transported into the chamber of take-up compartment 6, the cartridge is removed from the camera for processing of the exposed film.

As indicated previously, modern high-speed film processors have been adapted to operate in different modes depending on the length of the film in a cartridge to thereby increase the efficiency of the processor. For example, many modern film processors sequentially remove filmstrip from film cartridges and splice their ends together to permit the continuous processing of a virtually continuous web of film. The splicing operation requires a determination of the lengths of each of the filmstrips (unless the relatively inefficient expedient of using separate splicers for each length of film were employed, which would also require a sorting operation). Heretofore, the filmstrip lengths have generally been determined manually as indicated in previously cited U.S. Ser. No. 854,886 after the film has been removed from the cartridge. The provision of means on the cartridge for indicating the length of the film therein thus enhances the efficiency of a processor adapted to sense the length-indicating means.

Figure 2:
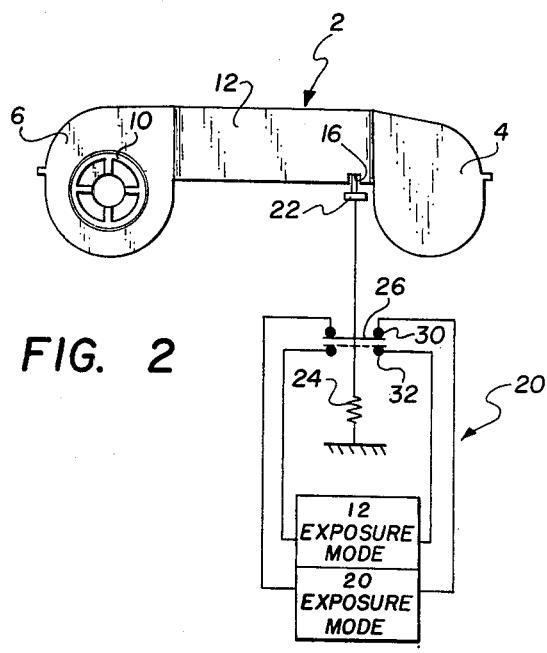
FIG. 2 is a schematic view of a film processor determining the length of film in a film cartridge in accordance with the invention.

Accordingly, a film processing machine or processor 20 is shown schematically in FIG. 2 for the sake of clarity, and because the details of the processor are not a part of the present invention. Processor 20 is adapted to sense the presence or absence of notch 16 to effect the proper film length-dependent mode of operation of the processor. These modes can relate to the manner of withdrawal of film from the cartridge and to the manner of splicing successive lengths of film together, although the invention is not restricted to these processing functions. Thus, the means for performing the respective modes of the processing function are indicated schematically by two appropriately labelled sections of processor 20. A sensing finger 22 is provided for sensing the presence or absence of notch 16 and is biased by a spring 24 towards engagement with the cartridge. Of course, means are provided for positioning the cartridge relative to finger 22 so that the finger can sense the presence or absence of notch 16 at the prescribed location on the cartridge.

An electrical or fluidic circuit is incorporated for effecting the proper mode of operation of the processor. Hence, a switch 26 is movable between positions 30 and 32 (which are separated by a distance less than the depth of notch 16) depending on whether or not notch 16 is provided at the prescribed cartridge location. When notch 16 is defined by the cartridge, spring 24 urges finger 22 forwardly into the notch and switch 26 moves to position 30 to close the circuit, thereby effecting the 20 exposure mode of operation of processor 20. On the other hand, when no notch is detected, switch 26 assumes position 32 to effect the 12 exposure mode.

Although the exposure frame-length indicating means has been shown as a notch 16 in lower wall 14, the invention is not limited to this arrangement. The indicator need not be a notch, and could be any indicating means discernible by a sensing member of a film processor. The indicating means is not confined to the lower cartridge wall, but could be disposed elsewhere on the cartridge. Moreover, where more than two lengths of film could be loaded in a cartridge, indicating means corresponding to each length could be employed. Although the invention has been described with reference to a still picture film cartridge, it is also applicable to motion picture film cartridges. In addition, the film processor described above is not restricted in its design that is shown herein, and any processor incorporating means for sensing the film length indicating means provided on a cartridge for effecting the mode of operation of the processor lies within the scope of the invention.

The invention has been described in detail with particular reference to the detailed embodiment, but it will be understood that variations and modifications can be effected within the spirit and scope of the invention.

I claim:
1. Photographic apparatus comprising:
  a. a film cartridge for holding filmstrip of one of two predetermined dissimilar lengths, said cartridge including:
    1. a supply compartment for containing unexposed filmstrip;
    2. a take-up compartment for receiving exposed filmstrip;
    3. first and second sidewall members interconnecting said compartments; and
    4. means carried by one of said sidewall members for indicating when said cartridge contains a filmstrip of the longer one of said two predetermined lengths; and
  b. a film processor for handling the filmstrip held by said cartridge and having two modes of operation, an appropriate one of said modes being selectable as a function of the length of filmstrip in said cartridge, said processor comprising:
  means for sensing the presence of said indicator means to determine the length of the filmstrip in said cartridge and for effecting the selection of the appropriate mode of operation of said processor in response to such determination.

2. Photographic apparatus comprising:
  a. a film cartridge for holding filmstrip of one of two predetermined dissimilar lengths, said cartridge including:
    1. a supply compartment for containing unexposed filmstrip;
    2. a takeup compartment for receiving exposed filmstrip;
    3. first and second spaced sidewall members interconnecting said supply and takeup compartments;
    4. an indentation formed in one of said sidewall members for indicating that said cartridge contains a filmstrip of the longer one of said two predetermined lengths;
  b. a film processor for handling the filmstrip held by said cartridge, said processor having a first mode of operation wherein the processor is operable to treat a filmstrip of the shorter one of said two lengths and a second mode of operation for treating a filmstrip of the longer of said two lengths, said processor comprising;
  switching means cooperable with both said cartridge and said processor for:
    1. sensing the presence or absence of said indentation and, in response to said sensing,
    2. respectively effecting said second or first mode of operation for said processor.

* * * * *